(12) United States Patent
Pro

(10) Patent No.: US 7,986,494 B2
(45) Date of Patent: Jul. 26, 2011

(54) INTEGRATED LEAD HEAD SUSPENSION WITH TAPERED TRACE SPACING

(75) Inventor: John D. Pro, Prior Lake, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 544 days.

(21) Appl. No.: 11/744,623

(22) Filed: May 4, 2007

(65) Prior Publication Data

US 2008/0273266 A1   Nov. 6, 2008

(51) Int. Cl.
*G11B 5/48* (2006.01)
*G11B 21/16* (2006.01)

(52) U.S. Cl. .................................. 360/245.9

(58) Field of Classification Search ........ 360/244.1, 360/264.2, 245.3, 245.8, 245.9, 246
See application file for complete search history.

(56) References Cited

U.S. PATENT DOCUMENTS

| | | | |
|---|---|---|---|
| 3,320,556 A | 5/1967 | Schneider | |
| 5,140,288 A | 8/1992 | Grunwell | |
| 5,608,591 A | 3/1997 | Klaassen | |
| 5,631,786 A | 5/1997 | Erpelding | |
| 5,717,547 A | 2/1998 | Young | |
| 5,737,152 A | 4/1998 | Balakrishnan | |
| 5,796,552 A | 8/1998 | Akin, Jr. et al. | |
| 5,995,328 A | 11/1999 | Balakrishnan | |
| 6,038,102 A | 3/2000 | Balakrishnan et al. | |
| 6,275,358 B1 | 8/2001 | Balakrishnan et al. | |
| 6,493,190 B1 * | 12/2002 | Coon | 360/245.9 |
| 6,737,931 B2 | 5/2004 | Amparan et al. | |
| 6,798,597 B1 | 9/2004 | Aram et al. | |
| 6,839,204 B2 | 1/2005 | Shiraishi et al. | |
| 6,975,488 B1 | 12/2005 | Kulangara et al. | |
| 7,079,357 B1 * | 7/2006 | Kulangara et al. | 360/245.9 |
| 7,092,215 B2 | 8/2006 | Someya et al. | |
| 7,643,252 B2 * | 1/2010 | Arai et al. | 360/245.9 |
| 7,667,921 B2 * | 2/2010 | Satoh et al. | 360/75 |
| 7,675,713 B2 * | 3/2010 | Ogawa et al. | 360/264.2 |
| 7,692,899 B2 * | 4/2010 | Arai et al. | 360/244.3 |
| 7,701,673 B2 * | 4/2010 | Wang et al. | 360/245.3 |
| 7,701,674 B2 * | 4/2010 | Arai | 360/245.9 |
| 7,724,478 B2 * | 5/2010 | Deguchi et al. | 360/245.9 |
| 2005/0063097 A1 * | 3/2005 | Maruyama et al. | 360/245.9 |
| 2008/0192384 A1 * | 8/2008 | Danielson et al. | 360/245.9 |

FOREIGN PATENT DOCUMENTS

EP          0834867          5/2007

* cited by examiner

*Primary Examiner* — Julie A Watko
(74) *Attorney, Agent, or Firm* — Faegre & Benson LLP

(57) ABSTRACT

An integrated lead flexure for a disk drive head suspension, comprising two or more spaced-apart traces extending between terminal connector pads and head connector pads, wherein the spacing between the traces substantially continuously decreases along at least a portion of the length of the traces.

20 Claims, 6 Drawing Sheets

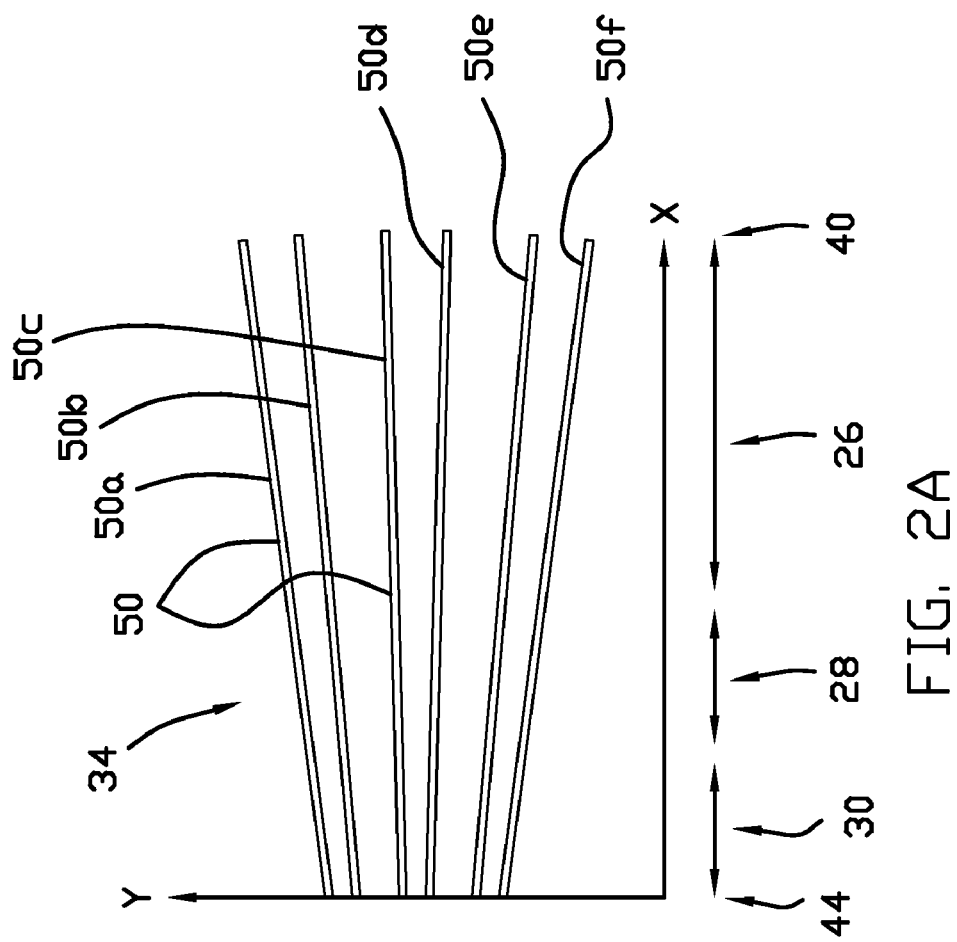

INTEGRATED LEAD HEAD SUSPENSION WITH TAPERED TRACE SPACING

TECHNICAL FIELD

The present invention relates generally to disk drive head suspensions. In particular, the invention is an integrated lead flexure for a suspension.

BACKGROUND

Disk drive head suspensions with wireless or integrated lead flexures are generally known and disclosed, for example, in the following U.S. patents, all of which are incorporated herein by reference.

| Inventor Name | U.S. Pat. No. |
| --- | --- |
| Klaassen | 5,608,591 |
| Erpelding | 5,631,786 |
| Young | 5,717,547 |
| Balakrishnan | 5,737,152 |
| Balakrishnan | 5,995,328 |
| Balakrishnan et al. | 6,038,102 |
| Balakrishnan et al. | 6,275,358 |
| Shiraishi et al. | 6,839,204 |
| Kulangara et al. | 6,975,488 |

The continuing development of read/write head and related disk drive technology requires flexures having improved mechanical and electrical specifications. For example, the read/write head often has a significantly different characteristic impedance than the pre-amp circuit. Such impedance mismatching gives rise to various problems. For example, impedance mismatching between the read/write head and the pre-amp circuit can cause signal reflection and power loss. There remains, therefore, a continuing need for integrated lead flexures having improved impedance characteristics.

SUMMARY

The present invention is an improved integrated lead flexure having tapered trace spacing. One embodiment includes two or more spaced-apart traces extending between terminal connector pads and head connector pads. The spacing between the traces substantially continuously decreases along at least a portion of the length of the traces.

An integrated lead flexure in accordance with another embodiment of the invention includes a spring metal layer, an insulating layer over the spring metal layer, a plurality of terminal connector pads, a plurality of head connector pads, and an integrated transmission line array from the terminal connector pads to the head connector pads. The integrated transmission line array includes a plurality of spaced-apart traces electrically insulated from one another by the insulating layer. Spacing between the traces substantially continuously decreases over at least a portion of the transmission pathway.

BRIEF DESCRIPTION OF THE DRAWINGS

FIG. 2A is a schematic view illustrating a trace-to-trace spacing of the flexure shown in FIG. 1.

DETAILED DESCRIPTION

Figure 1:
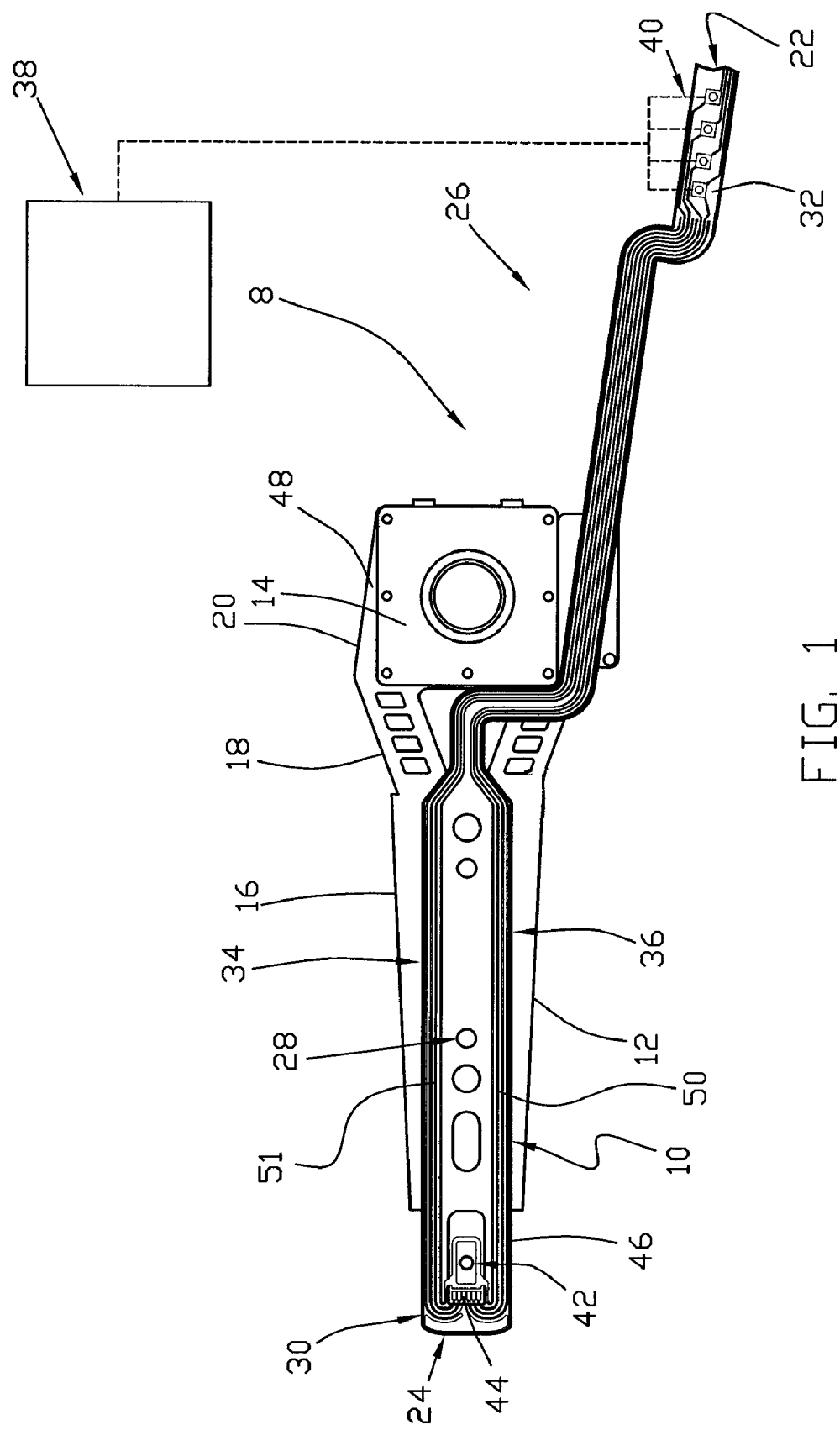
FIG. 1 is an illustration of a disk drive head suspension having a flexure in accordance with the present invention.

FIG. 1 shows a disk drive head suspension 8 including an integrated lead flexure 10 in accordance with one embodiment of the present invention. Suspension 8 is a three-piece assembly in the illustrated embodiment, and includes a load beam 12 and base plate 14 in addition to the flexure 10, although other configurations are also contemplated. Load beam 12, which is typically formed from stainless steel, includes a beam region 16, a hinge region 18 and a mounting region 20. The base plate 14 is welded to the mounting region 20 at the proximal end of the load beam 12.

The flexure 10 is an integrated lead, or wireless, flexure and has a proximal end 22 and a distal end 24. The illustrated embodiment of the flexure 10 has a tail region 26 extending from the proximal end 22, a mounting or base region 28 that is welded or otherwise attached to the beam region 16 of load beam 12, and a gimbal region 30 extending distally from the base region 28. The flexure 10 includes at least a first insulating layer 32 of a dielectric material and a first integrated transmission line array 34 and a second integrated transmission line array 36 extending over the first insulating layer 32. The transmission line arrays 34, 36 are formed by known additive and/or subtractive methods.

The proximal end of the tail region 26 includes a plurality of terminal connector pads 40 adapted for connection to electronics in the disk drive in which the suspension 8 is incorporated. For purposes of illustration, the connector pads 40 are shown connected to a preamp/driver circuit 38, as shown generally in FIG. 1. The gimbal region 30 includes a slider mounting region 42 for mounting a head slider having a transducer head (not shown).

The slider mounting region 42 includes a plurality of head connector pads 44. In general terms, the plurality of head connector pads 44 are bond pads for providing an electrical connection to the transducer head.

Base region 28 and portions of the gimbal region 30 are formed from a spring metal layer 48. Stainless steel is commonly used for the spring metal layer 48 in applications of this type. Portions of the electrical structures, including the connector pads 40, 44 and the integrated transmission line arrays 34, 36 that overlay the spring metal layer 48 are spaced and electrically insulated from the spring metal layer 48 by the first insulating layer 32, for example. For reference, polyimide is one acceptable dielectric material for providing electrical insulation in applications of this type.

The plurality of head connector pads 44 can be flying pads that extend over a window in the spring metal layer 48. In other embodiments of the invention, some or all of the connector pads 40, 44 and portions or all of the integrated transmission line arrays 34, 36 can be backed by or overlay the spring metal layer 48 (e.g., traces comprising the integrated transmission line arrays 34, 36 can extend over a pair of spring arms 46 in the gimbal region 30).

The integrated transmission line arrays 34, 36 are each formed by a plurality of traces. For example, the first integrated transmission line array 34 includes a plurality of traces 50, for example write traces, forming a transmission pathway from the terminal connector pads 40 to the head connector pads 44 while the second integrated transmission line array 36 includes a plurality of traces 51, for example read traces, traversing another transmission pathway from the terminal connector pads 40 to the head connector pads 44, although other configurations are contemplated. The first and second integrated transmission line arrays 34, 36 include coplanar traces which extend within a common layer, although multilayer, or stacked, configurations are also contemplated as subsequently described in greater detail.

FIG. 2A is a schematic view illustrating relative trace positions for the integrated transmission line array 34 as the array 34 extends along the transmission pathway between the terminal connector pads 40 and the head connector pads 44 according to one embodiment. For reference, trace-to-trace position is defined along the Y-axis while relative position along the transmission pathway is defined along the X-axis in FIG. 2A. Relative positions of various portions of the flexure 10 are generally designated along the X-axis in FIG. 2A, including the terminal connector pads 40, the tail region 26, the base region 28, the gimbal region 30, and the head connector pads 44.

In one embodiment, the spaced-apart traces 50 of the first integrated transmission line array 34 and/or the traces 51 of the second transmission line array 36 have an interleaved configuration where a first set of electrically connected signal conductor traces 50a, 50c, 50e, having a first polarity alternate with a second set of electrically connected conductor traces 50b, 50d, 50f having a second polarity. One or both of the transmission line arrays 34, 36 have two trace, three trace, four trace, or six trace configurations, although other configurations are also contemplated. It should also be understood that stacked or multi-layer trace configurations for one or both of the transmission line arrays 34, 36 are also contemplated, as described in greater detail with reference to FIGS. 3-5.

In general terms, one or both of the integrated transmission line arrays 34, 36 are characterized by substantially continuously decreasing trace-to-trace spacing over at least a portion of the transmission pathways they traverse, respectively. As described in greater detail, the tapered, or substantially decreasing spacing between traces 50 causes the integrated transmission line array 34 to have a higher characteristic impedance at the terminal connector pads 40 than at the head connector pads 44. This varying impedance characteristic can facilitate impedance matching between drive components connected to the terminal connector pads 40 and head connector pads 44, respectively. The above-referenced, continuously tapered trace-to-trace spacing, and thus tapered impedance, facilitates improved electrical performance. For example, the impedance presented by the write head (not shown), such as perpendicular magnetic recording (PMR) writer, is much lower (e.g., less than 20 ohms) than the preamp circuit 38 (e.g., greater than 40 ohms) that drives the write head.

A decreasing taper in impedance from the head connector pads 44 connected to the write head (not shown) to the corresponding terminal connector pads 40 allows the integrated transmission line array(s) 34 to more closely match the differential impedances of the write head and the preamp/driver circuit 38, respectively, which reduces various problems, such as energy reflection from the write head into the preamp/driver circuit 38, power loss, and others. Additionally, a footprint of the integrated transmission line array(s) 34 is optionally reduced toward the gimbal region 30 where more efficient use of space is desirable.

Although non-continuous, or discontinuous, tapers in trace-to-trace spacing are contemplated, discontinuity in portions of the transmission pathway where trace-to-trace spacing is decreasing can reduce benefits relating to signal reflection, power consumption, higher bandwidth performance, and others.

In one embodiment, the first transmission line array 34 includes a first trace 50a to a sixth trace 50f, although greater or fewer traces are also contemplated. As previously referenced, the first transmission line array 34 is optionally of an interleaved design, with the first, third and fifth traces 50a, 50c, 50e being electrically connected at locations on or off the flexure 10 to form a first polarity signal path. In turn, the second, fourth and sixth traces 50b, 50d, 50f can be electrically connected at locations on or off of the flexure 10 to form a second polarity signal path.

The integrated transmission line array 34 is characterized by a continuously decreasing trace spacing between at least two traces 50 as the integrated transmission line array 34 extends along the transmission pathway. As previously referenced, the characteristic impedance of the integrated transmission line array 34 tends to decrease as trace spacing decreases. Thus, in one embodiment, characteristic impedance of the transmission line array 34 decreases, or is tapered, in a substantially continuous manner over at least a portion of the transmission pathway moving away from the terminal connector pads 40.

As one non-limiting example, characteristic impedance of the integrated transmission line array 34 optionally tapers from about 40 ohms at the terminal connector pads 40 to about 20 ohms at the head connector pads 44. The integrated transmission line array 34 decreases in characteristic impedance from the terminal connector pads 40 to the head connector pads 44 by a factor of about 1.5 or greater, of about 2 or greater, or some other factor as desired.

FIG. 2A generally indicates substantially continuously decreasing spacing between all adjacent traces 50 over the entire transmission pathway. In particular, and as generally illustrated in FIG. 2A, spacing between the first and second traces 50a, 50b decreases in a substantially continuous manner from proximate the terminal connector pads 40 to the head connector pads 44. Spacing between the second and third traces 50b, 50c also decreases in a substantially continuous manner from proximate the terminal connector pads 40 to proximate the head connector pads 44. Each of the remaining adjacent pairs of the traces 50c and 50d, 50d and 50e, and 50e and 50f similarly continuously decreases, or tapers, in trace-to-trace spacing moving away from the terminal connector pads 40.

In other embodiments, less than all of the adjacent traces 50a-50f continuously decrease in trace-to-trace spacing and/or there is a continuous decrease in trace spacing through less than an entirety of the transmission pathway, for example, through one or more of the tail region 26, the base region 28, the gimbal region 30, or portions thereof.

In the embodiment shown in FIG. 2A, the spacing between adjacent pairs of traces decreases according to a substantially linear function, or relationship. However, in other embodiments (not shown), the spacing between one or all adjacent pairs of traces of the integrated transmission line array 34 decreases continuously according to an exponential relationship or other non-linear relationship, such as a quadratic relationship, for example.

One non-limiting example of relative trace spacing values is presented to facilitate understanding. In particular, in one embodiment, the spacing between the first and sixth traces 50a, 50f is about 240 micrometers proximate the terminal connector pads 40 and about 160 micrometers proximate the head connector pads 44. In one embodiment, each trace is about 12 micrometers wide, with spacing between each of the traces 50a-50f being about 24 micrometers proximate the terminal connector pads 40 and about 8 micrometers proximate the head connector pads 44, although other dimensions are contemplated.

The spacing between adjacent traces need not be the same for the integrated transmission line array 34. In another non-limiting example, spacing between the first and second traces 50a, 50b, between the third and fourth traces 50c, 50d, and between the fifth and sixth traces 50e, 50f is about 24 micrometers proximate the terminal connector pads 40 and about 8 micrometers proximate the head connector pads 44. In turn, the spacing between each of the second and third traces 50b, 50c and between the fourth and fifth traces 50d, 50e is about 26 micrometers proximate the terminal connector pads 40 and about 10 micrometers proximate the head connector pads 44, although other dimensions are contemplated.

In some embodiments, the second integrated transmission line array 36 also includes tapered trace spacing, where the spacing between one or all adjacent traces 51 of the second integrated transmission line array 36 decreases continuously or discontinuously as desired. The second integrated transmission line array 36 can taper in a similar manner to any of the embodiments described in association with the first integrated transmission line array 34, although the taper direction is optionally opposite to that of the first integrated transmission line array 34 in some embodiments. In particular, in some embodiments, the second integrated transmission line array 36 decreasingly tapers in impedance along an associated transmission pathway moving away from the head connector pads 44, such as a continuously decreasing taper in impedance from proximate the head connector pads 44 to proximate the terminal connector pads 40.

A decreasing taper in impedance from the head connector pads 44 to the terminal connector pads 40 can improve electrical performance of a read head (not shown) connected at the head connector pads 44 and connected to the terminal connector pads 40 via the second integrated transmission line array 36. In particular, In one non-limiting example, the second integrated transmission line array continuously tapers from a characteristic impedance of about 100 ohms at the read head (connected to the head connector pads 44) to a characteristic impedance of about 70 ohms at the terminal connector pads 40. This decreasing taper in impedance from the read head can improve effective bandwidth of the read head, as well as reduce cross-talk and noise associated with the second integrated transmission line array 36.

Figure 2B:
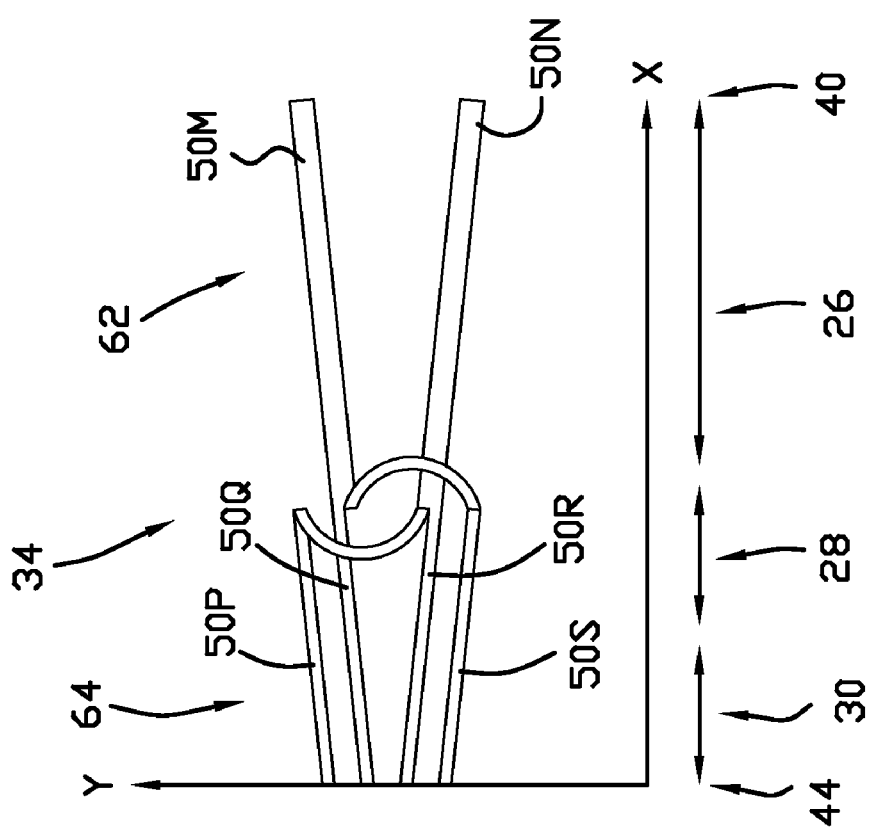
FIG. 2B is a schematic view illustrating another trace-to-trace spacing of the flexure shown in FIG. 1.

FIG. 2B is a schematic view of another relative spacing of the first integrated transmission line array 34. Although, FIG. 2B is generally described with reference to the first integrated transmission line array 34, similar principles are applicable to the second integrated transmission line array 36. FIG. 2B shows the first integrated transmission line array 34 including a combination two or more tapered trace segments. In particular, the integrated transmission line array 34 includes a cascaded arrangement, with a first segment 62 having a different trace configuration than a second segment 64.

Figure 2C:
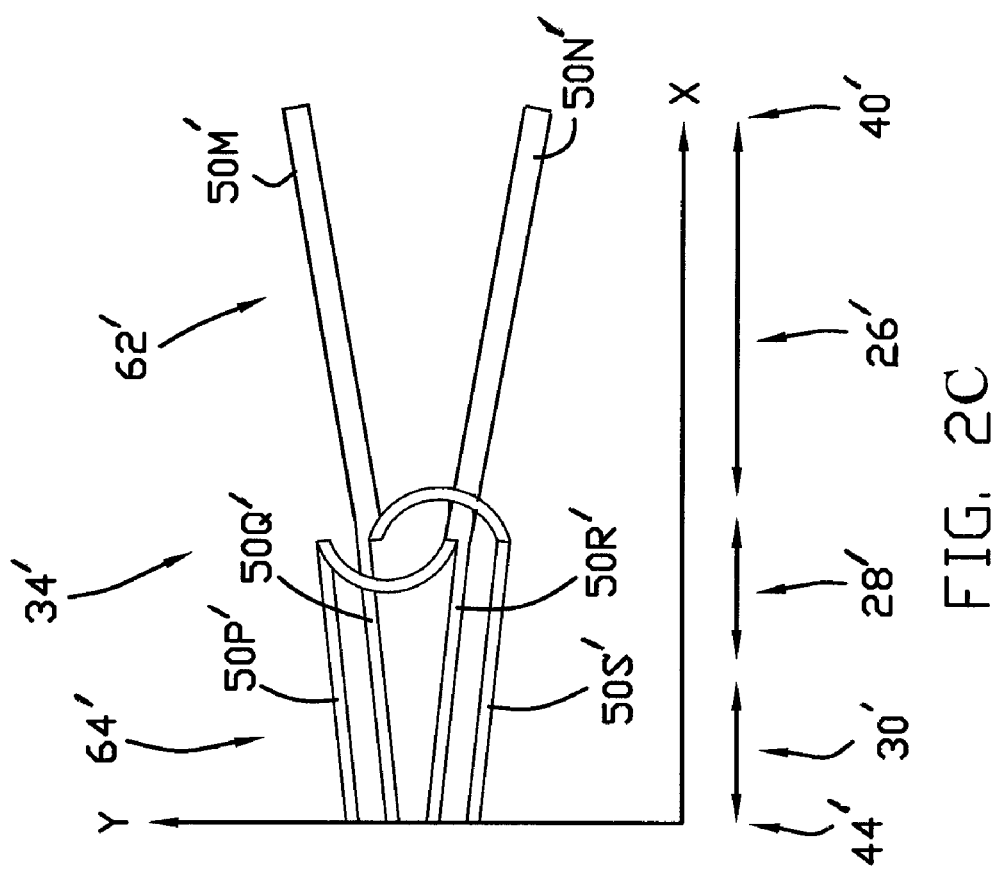
FIG. 2C is a schematic view illustrating another trace-to-trace spacing of the flexure shown in FIG. 1.

In one embodiment, the first segment 62 includes first and second traces 50M, 50N, which then split at the second segment 64 into an interleaved array of third, fourth, fifth, and sixth traces 50P, 50Q, 50R, 50S, where the third and fifth traces 50P, 50R are electrically connected to the second trace 50N and the fourth and sixth traces 50Q, 50S are electrically connected to the first trace 50M. By varying the number of traces, as well as other trace characteristics such as trace width and the taper in spacing (e.g., as shown in FIG. 2C), multiple impedance transformations are realized.

In some embodiments the first segment 62 extends from the terminal connector pads 40 to the load beam 12, with a taper, or transformation in characteristic impedance from about 100 ohms at the terminal connector pads 40 to a characteristic impedance of about 50 ohms at the mounting region 28. The second segment 64 performs a second taper, or transformation in characteristic impedance over the mounting region 28 and the gimbal region 30. For example, the second segment 64 is characterized by a taper in impedance from about 50 ohms to about 30 ohms at the head connector pads 44, for a total transformation of about 100 ohms at the terminal connector pads 40 to about 30 ohms at the head connector pads 44. In other embodiments, a total transformation of from about 80 ohms at the terminal connector pads 40 to about 20 ohms at the head connector pads 44 is accomplished. Thus, some embodiments include transformations in characteristic impedance by a factor of about 4 or more, for example.

Any of a variety of cascaded arrangements are contemplated. For example, in other embodiments (not shown), a tapered four-trace interleaved segment is connected to a tapered six-trace interleaved segment. In still other embodiments, one or both of the integrated transmission line arrays 34, 36 incorporate a greater number of segments, for example three segments including a tapered eight-trace interleaved segment, a tapered six-trace interleaved segment, and a tapered four-trace interleaved segment. Additionally, impedance can be tapered in an opposite direction to that shown in FIG. 2B, i.e., a cascaded decrease in impedance in a direction along a transmission pathway moving away from the head connector pads 44.

Figure 3:
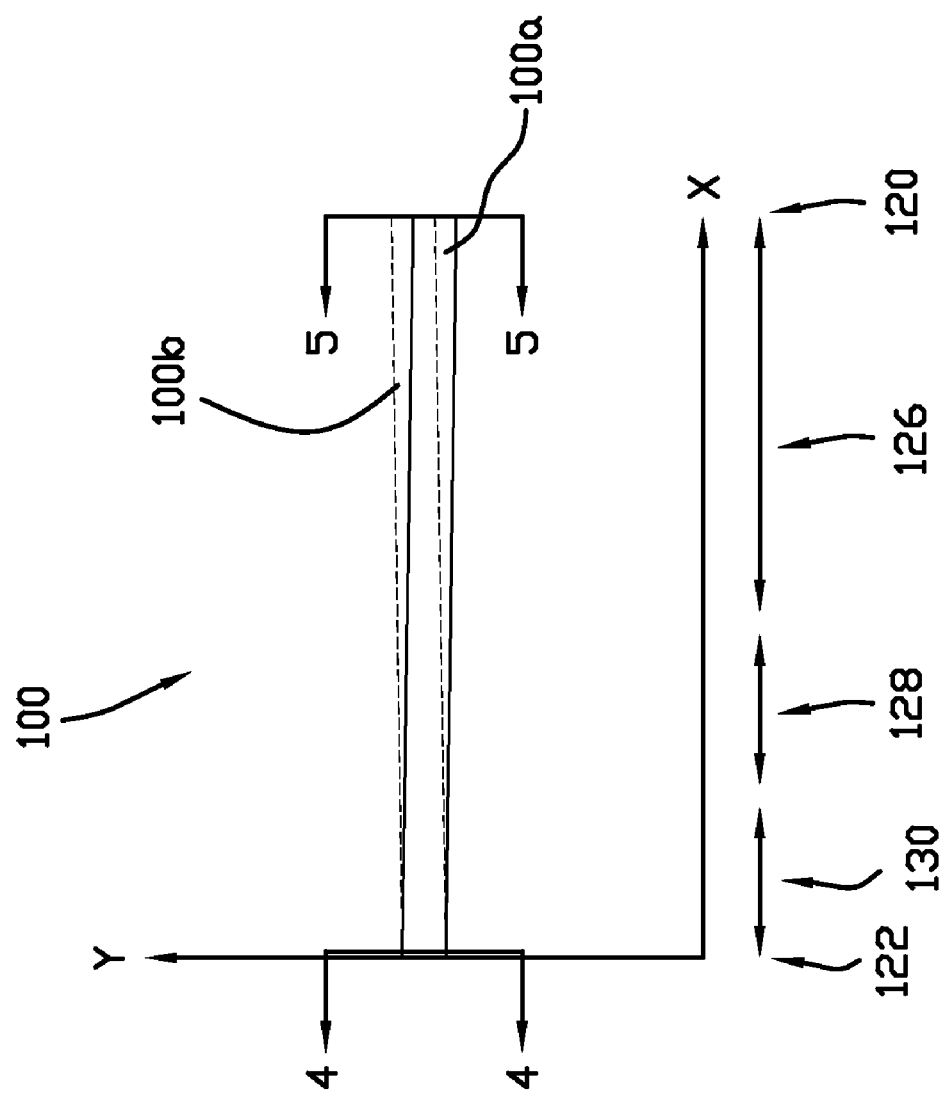
FIGS. 3-5 are schematic views illustrating trace-to-trace spacing of another flexure in accordance with the present invention.
Figure 4:
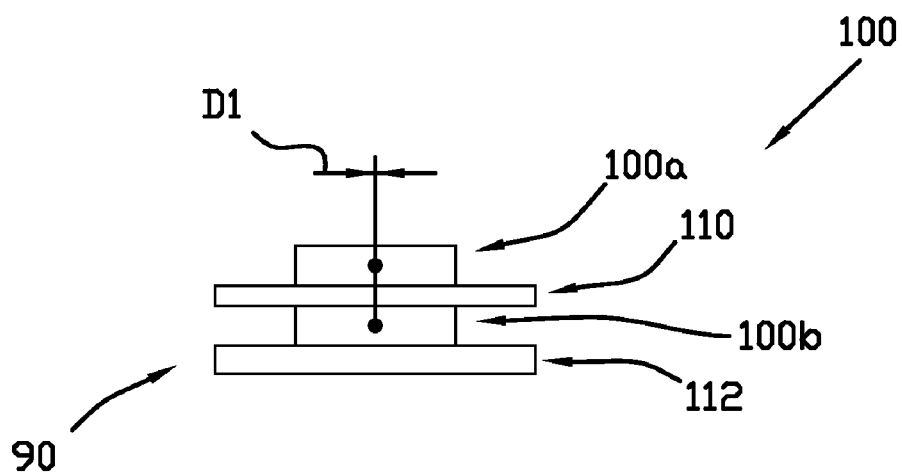
Figure 5:
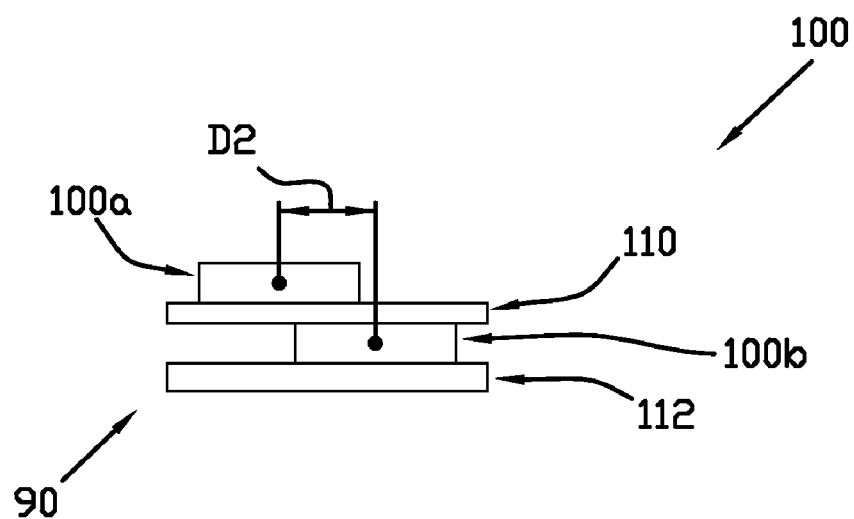

FIGS. 3-5 are schematic views illustrating a flexure 90 including an integrated transmission line array 100 having a multi-layer, or stacked construction in accordance with another embodiment of the invention. The integrated transmission line array 100 includes a first trace 100a extending over a first insulating layer 110 and a second trace 100b extending under the first insulating layer 110 and over a second insulating layer 112. The first and second traces 100a, 100b are spaced-apart and electrically insulated from one another by at least the first insulating layer 110.

The first and second traces 100a, 100b are optionally a read pair or a write pair of conductive traces having a first and a second polarity, respectively. Similarly to the integrated transmission line arrays 34, 36, the integrated transmission line array 100 extends through a tail region 126, a base region 128, and a gimbal region 130. In particular, the integrated transmission line array 100 extends along a transmission pathway from a first position 120 having a plurality of terminal connector pads, such as the terminal connector pads 40, to a second position 122 having a plurality of head connector pads, such as the head connector pads 44.

FIG. 4 is a schematic view of a cross-section of the flexure 90 showing the first and second traces 100a, 100b at a spacing $D_1$ corresponding to the second position 122 on FIG. 3. In turn, FIG. 5 is a schematic view of a cross-section of the flexure 90 showing the first and second traces 100a, 100b at a spacing $D_2$ corresponding to the first position 120. The spacing $D_2$ at the first position 120 is greater than the spacing $D_1$ at the second position 122. In some embodiments, the first and second traces 100a, 100b are substantially vertically aligned at the second position 122, such that the spacing $D_1$ approaches zero, or zero offset.

As shown in FIGS. 3-5, the trace-to-trace spacing between the adjacent first and second traces 100a, 100b continuously decreases along the transmission pathway toward the second position 122. For reference, similarly to FIG. 2A, trace-to-trace position is defined along the Y-axis while relative position along the transmission pathway is defined along the X-axis in FIG. 3. Relative positions of various portions of the flexure 90 are also generally designated along the X-axis in FIG. 3.

The continuous decrease in spacing optionally occurs as a linear function, or relationship, as is shown generally in FIG. 3, or as an exponential relationship or other non-linear relationship, such as quadratic function, for example. The continuously decreasing spacing optionally occurs over the entire transmission pathway or portions thereof, as referenced in association with other embodiments. As the spacing decreases, characteristic impedance of the integrated transmission line array 100 also decreases. Thus, similar to previously described embodiments, impedance matching is also optionally accomplished in embodiments having stacked trace configurations.

The foregoing description is to be read as a whole, with features and principles described in association with the various embodiments being taken cumulatively in nature. Although the present invention has been described with reference to preferred embodiments, those skilled in the art will recognize that changes can be made in form and detail without departing from the spirit and scope of the invention.

What is claimed is:

1. An integrated lead flexure for a disk drive head suspension, the integrated lead flexure comprising:
a spring metal base layer;
an insulating layer over the spring metal base layer;
a plurality of terminal connector pads;
a plurality of head connector pads;
a first integrated transmission line array including a first plurality of spaced-apart traces electrically insulated from one another by the insulating layer and extending together along a first transmission pathway between the terminal connector pads and the head connector pads and including a first transmission line array segment and a second transmission line array segment, the first transmission line array segment having a taper in trace spacing to define substantially continuously decreasing trace spacing and the second transmission line array segment having a taper in trace spacing to define substantially continuously decreasing trace spacing, the first and second transmission line array segments having different tapers in trace spacing such that multiple different impedance tapers are exhibited along the transmission line array and the first integrated transmission line array exhibits a different characteristic impedance at the terminal connector pads than at the head connector pads.

2. The integrated lead flexure of claim 1, wherein the first segment substantially continuously decreases in spacing in a direction from the terminal connector pads to the head connector pads.

3. The integrated lead flexure of claim 1, wherein the first segment substantially continuously decreases in spacing in a direction from the head connector pads to the terminal connector pads.

4. The integrated lead flexure of claim 1, wherein the plurality of traces extend over the insulating layer.

5. The integrated lead flexure of claim 1, wherein the plurality of traces includes first and second stacked traces on opposite sides of the insulating layer.

6. The integrated lead flexure of claim 1, wherein the spacing between the first plurality of traces decreases from proximate the terminal connector pads to proximate the head connector pads.

7. The integrated lead flexure of claim 1, wherein the trace spacing of the first and second segments decreases substantially continuously according to a linear relationship.

8. The integrated lead flexure of claim 1, wherein the trace spacing of the first and second segments tapers substantially continuously according to a non-linear relationship.

9. The integrated lead flexure of claim 1, wherein the integrated transmission line array substantially continuously decreases in characteristic impedance from the terminal connector pads to the head connector pads by a factor of about 1.5 or more.

10. The integrated lead flexure of claim 1, wherein the first trace segment includes a different number of traces than the second trace segment.

11. The integrated lead flexure of claim 1, further comprising a second integrated transmission line array including a second plurality of spaced-apart traces electrically insulated from one another along a second transmission pathway, the second integrated transmission line array having a taper direction defined by substantially continuously decreasing spacing between the second plurality of spaced-apart traces over at least a portion of the second transmission pathway, a taper direction of the first transmission line array being opposite to that of the second transmission line array.

12. The integrated lead flexure of claim 1, wherein the spacing between the first plurality of spaced-apart traces decreases along a tail region, a base region, and a gimbal region of the flexure.

13. An integrated lead flexure for a disk drive head suspension, comprising two or more spaced-apart traces extending along a common transmission pathway between terminal connector pads and head connector pads, wherein the common transmission pathway includes a first segment and a second segment, the spacing between the traces along the first segment substantially continuously decreasing along the common transmission pathway resulting in a first taper in impedance and the spacing between the traces along the second segment substantially continuously decreasing along the common transmission pathway resulting in a second taper in impedance that is different from the first taper in impedance, and further wherein the transmission pathway exhibits a different characteristic impedance at the terminal connector pads than at the head connector pads.

14. The integrated lead flexure of claim 13, wherein the spacing between the traces along the first segment substantially continuously decreases along the portion of the length of the traces with increasing distance from the terminal connector pads.

15. The integrated lead flexure of claim 13, wherein the spacing between the traces along the first segment decreases substantially continuously according to a linear relationship.

16. The integrated lead flexure of claim 13, wherein the spacing between the traces decreases from proximate the terminal connector pads to proximate the head connector pads.

17. The integrated lead flexure of claim 13, wherein the traces include coplanar traces.

18. An integrated lead flexure for a disk drive head suspension of the type having a plurality of spaced-apart leads extending adjacent one another between terminal connector pads and head connector pads, a terminal connector pad impedance between a pair of leads at the terminal pads, and a head connector pad impedance between the leads at the head connector pads, comprising spacing between the traces that substantially continuously decreases along a first segment of the length of the traces according to a first taper and spacing between the traces that substantially continuously decreases along a second segment of the length of the traces according to a second taper such that the terminal connector pad impedance between the pair of leads at the terminal pads is substantially different than the head connector pad impedance between the leads at the head connector pads.

19. The integrated lead flexure of claim 18, wherein spacing between the pair of traces decreases with increasing distance from the terminal connector pads such that the terminal connector pad impedance between the pair of leads at the terminal pads is substantially greater than the head connector pad impedance between the leads at the head connector pads.

20. The integrated lead flexure of claim 18, wherein the traces decrease in spacing from proximate the terminal connector pads to proximate the head connector pads.

* * * * *